US012060977B1

(12) United States Patent
Harris

(10) Patent No.: US 12,060,977 B1
(45) Date of Patent: Aug. 13, 2024

(54) ENHANCED SOLID-STATE LIGHT SOURCE AND ELECTRONIC SIMULATED CANDLE

(71) Applicant: Geoffrey Herbert Harris, Chicago, IL (US)

(72) Inventor: Geoffrey Herbert Harris, Chicago, IL (US)

( * ) Notice: Subject to any disclaimer, the term of this patent is extended or adjusted under 35 U.S.C. 154(b) by 807 days.

(21) Appl. No.: 17/217,420

(22) Filed: Mar. 30, 2021

Related U.S. Application Data

(63) Continuation of application No. 16/656,809, filed on Oct. 18, 2019, now Pat. No. 10,995,919, which is a continuation of application No. 15/984,489, filed on May 21, 2018, now abandoned, which is a continuation of application No. 15/589,718, filed on May 8, 2017, now Pat. No. 9,976,716, which is a continuation of application No. 12/771,497, filed on Apr. 30, 2010, now Pat. No. 9,644,807.

(51) Int. Cl.
*F21S 10/04* (2006.01)
*F21V 23/00* (2015.01)
*F21S 6/00* (2006.01)
*F21V 23/04* (2006.01)

(52) U.S. Cl.
CPC ............ *F21S 10/04* (2013.01); *F21V 23/002* (2013.01); *F21S 6/001* (2013.01); *F21V 23/0471* (2013.01)

(58) Field of Classification Search
CPC ................................. F21S 6/001; F21S 10/04
USPC ......................................................... 362/253
See application file for complete search history.

(56) References Cited

U.S. PATENT DOCUMENTS

| | | | |
|---|---|---|---|
| 4,510,556 | A | 4/1985 | Johnson |
| 5,688,042 | A | 11/1997 | Madadi et al. |
| D404,506 | S | 1/1999 | Lodhie |
| D405,201 | S | 2/1999 | Lodhie |
| 5,890,794 | A | 4/1999 | Abtahi et al. |
| 6,086,220 | A | 7/2000 | Lash et al. |
| 6,227,679 | B1 | 5/2001 | Zhang et al. |
| D470,255 | S | 2/2003 | Lodhie |
| 6,525,668 | B1 | 2/2003 | Petrick |
| D474,848 | S | 5/2003 | Lodhie |
| 6,578,984 | B2 | 6/2003 | Chu et al. |
| 6,616,308 | B2 | 9/2003 | Jensen et al. |
| 6,621,222 | B1 | 9/2003 | Hong |

(Continued)

FOREIGN PATENT DOCUMENTS

| | | | |
|---|---|---|---|
| CN | 202580831 U | * | 12/2012 |
| CN | 102954361 | | 3/2013 |

(Continued)

OTHER PUBLICATIONS

Numerous Articles from EE Times/LEDs dated Sep. 21, 2009, pp. 3-39.

(Continued)

*Primary Examiner* — Christopher M Raabe
(74) *Attorney, Agent, or Firm* — Banner & Witcoff, Ltd.

(57) ABSTRACT

Apparatuses and systems are illustrated relating to solid-state light sources with enhanced designs. The configuration of the light sources may point the tips of the light sources in a single direction, in opposite directions, in a radial (e.g., a spoked-wheel configuration where all tips face outwards from center), or any other feasible configuration. The enhanced design is implemented in an electronic window candle product.

20 Claims, 3 Drawing Sheets

(56) References Cited

U.S. PATENT DOCUMENTS

| | | | |
|---|---|---|---|
| 6,659,632 | B2 | 12/2003 | Chen |
| 6,712,493 | B2 | 3/2004 | Tell et al. |
| 6,719,443 | B2 | 4/2004 | Gutstein et al. |
| 6,981,786 | B2 | 1/2006 | Yao et al. |
| 7,053,560 | B1 | 5/2006 | Ng |
| D528,674 | S | 9/2006 | Gonzalez |
| 7,125,142 | B2 | 10/2006 | Wainwright |
| D536,107 | S | 1/2007 | Egawa et al. |
| 7,182,489 | B2 | 2/2007 | Yao et al. |
| 7,201,500 | B2 | 4/2007 | Mishan |
| D543,288 | S | 5/2007 | Bembridge |
| 7,354,174 | B1 | 4/2008 | Yan |
| 7,360,918 | B2 | 4/2008 | Trombetta et al. |
| D610,272 | S | 2/2010 | Guo et al. |
| D614,324 | S | 4/2010 | Boschetto |
| D621,078 | S | 8/2010 | Boschetto |
| 7,766,284 | B2 | 8/2010 | Boschetto |
| D639,464 | S | 6/2011 | Li et al. |
| D642,297 | S | 7/2011 | Boschetto et al. |
| D644,766 | S | 9/2011 | Su |
| D645,994 | S | 9/2011 | Crobeck |
| D646,813 | S | 10/2011 | Boschetto |
| 8,079,735 | B1 | 12/2011 | Vakil et al. |
| D674,925 | S | 1/2013 | Zhang |
| D675,350 | S | 1/2013 | Zhang |
| D690,446 | S | 9/2013 | Buttstaedt et al. |
| D819,845 | S | 6/2018 | Boschetto |
| 2002/0070643 | A1 | 6/2002 | Yeh |
| 2006/0146544 | A1 | 7/2006 | Leung |
| 2007/0127249 | A1 | 6/2007 | Medley et al. |
| 2008/0092800 | A1 | 4/2008 | Smith et al. |
| 2008/0285279 | A1 | 11/2008 | Ng et al. |
| 2015/0338087 | A1* | 11/2015 | Fang .................. F21V 33/0088 362/96 |

FOREIGN PATENT DOCUMENTS

| | | | |
|---|---|---|---|
| JP | 2000173323 | A | 6/2000 |
| WO | 9817942 | A1 | 4/1998 |
| WO | 9817948 | A1 | 4/1998 |

OTHER PUBLICATIONS

Williamsburg Cordless LED Candle with Streetside Brightness by Celestial Lights, downloaded Mar. 20, 2013 from Amazon.com, 3 pages.

Williamsburg Cordless LED Candle with Streetside Brightness, downloaded Mar. 20, 2013 from Brookstone.com, 2 pages.

Jan. 8, 2019—U.S. Appl. No. 15/984,489.

* cited by examiner

ENHANCED SOLID-STATE LIGHT SOURCE AND ELECTRONIC SIMULATED CANDLE

RELATED APPLICATIONS

This application is a continuation of U.S. patent application Ser. No. 16/656,809, filed Oct. 18, 2019, which is a continuation of Ser. No. 15/984,489, filed May 21, 2018, which is a continuation of U.S. patent application Ser. No. 15/589,718, filed May 8, 2017 (now U.S. Pat. No. 9,976,716), which is a continuation of U.S. patent application Ser. No. 12/771,497, filed Apr. 30, 2010 (now U.S. Pat. No. 9,644,807); all of the aforementioned are hereby incorporated by reference in their entireties.

TECHNICAL FIELD

Aspects of the disclosure relate to a solid-state light source. More specifically, aspects of the disclosure relate to enhanced designs for an electronic simulated candle comprising solid-state components.

BACKGROUND

In recent years light emitting diodes (LEDs) have made a grand entrance into mainstream applications. According to some studies, in 2009 alone, the worldwide sales of LEDs totaled over $5 billion. One reason for LEDs popularity over traditional incandescent bulbs is because LEDs are a more efficient source of light than incandescent bulbs. Many countries around the world have passed or will pass laws eventually banning production of or restricting the sale of incandescent bulbs. Meanwhile LEDs continue to increase in popularity. However, the fact remains that an incandescent bulb can output more light than an LED.

The Sep. 21, 2009 issue of "EE Times" is focused on LED technologies. In that publication, an article by Nicolas Mokhoff entitled, "Era of LED Lighting Dawns White," states that "[w]hen the incandescent lamp replaced the wax candle as a light source, it changed the way humanity conducted everyday—and night—activities . . . This year marks the dawn of a new age in lighting: that of the white LED, a brighter, more efficient way to light our lives. Lighting applications based on solid-state light sources are making headway towards replacing incandescent- and fluorescent-based lighting apps . . . In the short run, as LED replacement lamps become a viable alternative, regulators are encouraging the use of compact fluorescent lamps (CFLs). However, lighting experts contend that over the next five years the advantages of LED technology over CFLs will be recognized, especially with respect to the quality of the light, dimming features, controllability, lamp life and environmental cost of ownership . . . LED lamps will be used for directed-light applications, in hard-to-reach applications and where the cost of replacement is very high . . . Eventually, solid-state LED lighting might replace traditional incandescent or fluorescent solutions in virtually all commercial and consumer applications."

In that same publication of "EE Times," Christoph Hammerschmidt states in an article entitled, "Auto OEMs Switch On the High Beams for LED Apps," that "the design issues for LED headlights are not trivial. Some kind of temperature control for the headlight unit is required; designer are still debating the relative merits of fans and heat sinks. Further, with up to 80 LEDs crammed into one unit, contact reliability must be high enough not to cancel out the reliability gained by switching to LEDs. And both OEMs and carmakers bemoan the lack of standards for LED lighting, in particular for packaging."

Furthermore, in that same publication of "EE Times," an article by Bolaji Ojo entitled, "Shedding Light on the LED Distribution Chain," states that "'[a] lot of traditional lighting fixture companies, in the past, never had electronic engineers on staff. There was never a need for it.' said Arrow's Gatza. 'As the evolution of lighting has taken place, companies have needed to have engineers on staff who understand not only how you get the LEDs into the product, but also how to select the drivers for the LEDs.' Distributors today advise lighting companies . . . on such matters as what type of IC driver to install, whether to select an IC module or go the software route with a driver solution, how to choose among power supplies, what kind of thermal management system to use, and how to ensure the right products are selected and optimized to meet time-to-market goals."

In addition, in that same publication of "EE Times," Yolchiro Hata states in an article entitled, "Color-adjustable LED Lamps For Residential Market Get Aggressive on Price," that "Sharp added a light-color adjuster to its residential LED bulbs to address consumers' reservations about LED color performance, said Hironori Taniguchi of the Sharp LED center's product planning department. 'We place three 2,800 K color-temperature LEDs and three 5,000 K color-temperature LEDs inside the bulb,' Taniguchi said. 'Remote control adjusts the output ratio of each color-temperature LED. We implemented artifacts to create "daylight white" at 5,000 K by combining a blue LED element and a yellow fluorescent gas. To create the "classic white" bulb color at a 2,800 K color temperature, we combined a blue LED element with red fluorescent and green fluorescent gases.'"

Also in that same publication of "EE Times," Bill Schweber states in an article entitled, "LED Reality: Simple Devices, Complex Considerations," that "[t]he LED circuit designer has to balance conflicting objectives . . . First, of course, is the power source itself: How much current does it have to provide, and how good (stable and perhaps even programmable) does it have to be? If the LEDs have to be dimmed, should that be done by simple analog control of the current level or by pulse-width modulation with a variable duty cycle? Many applications require more optical output than a single LED can provide, or need a wider-area light source, such as for backlighting a display. Such designs can be accomplished with multiple LEDs, but there are many trade-offs in the topology of the multi-LED arrangement. Designers can choose basic serial string, a parallel grouping or a series/parallel combination. The trade-offs include accommodating a possible LED failure in a series path; deciding between a single-source power supply and multiple, smaller supplies; and considering the compliance voltage required of the current source as the voltage drops across the LEDs in a string. Then there's the heat. Certainly, LEDs are much more efficient than any other commercially available light source, converting between 60 and 80 percent of the electrical input into useful output (compared with roughly 10 percent for an incandescent bulb.) But the power that an LED doesn't use for light translates to heat, which remains in the LED die (in an old-fashioned incandescent bulb, of course, the wasteful dissipation is radiated out. As a consequence, designers must often plan for thermal management of LED-based illumination . . . [s]olutions can involve basic heat sinks, passive or forced airflow, pc board copper areas and even more-extensive schemes . . . . The focus turns to colorimetry and photometry—the LED's light itself—and this worry takes on various dimensions. LED output tends to dim with age (they last a long time, but they do age) so you have to make sure you'll have enough light output over your product's lifetime. The wave-length (color output) of an LED also changes with its drive level, which is a factor in some applications . . . Factors [in measuring optical power] include which wavelengths (colors) to include, over what solid angle, and how to handle the dispersed output over that solid angle (LED output is directional, of course)."

In addition, LED window candles are known in the art. Such LED window candles may provide for wax or a wax-like covering on the sidewall of the candle housing to simulate a candle. Moreover, these electronic simulated candles may include a flame-shaped glass bulb to further simulate a candle, and the LED may produce amber light to better resemble the color of candle light. The LED window candle may be powered by a battery-powered solar recharging lighting system. In another example, the light emission levels from the LED may be varied to simulate the flicker of candle light. However, prior art LED window candles are deficient in various aspects and improvement thereof are desirable.

BRIEF SUMMARY

The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

In one embodiment in accordance with aspects of the disclosure, an apparatus for an electronic candle is disclosed. The apparatus may comprise a housing, one or more solid-state light sources, and a circuitry connectable with a power source. The solid-state light source may include a plurality of leads extending from the light source. The leads may comprise an upper portion and a lower portion, where the portions are perpendicular (or nearly perpendicular, or substantially perpendicular) to each other. The apparatus may include an enclosure to encompass the light sources. In addition, the apparatus may include one or more electrical components (e.g., dimmer unit, flicker unit, light sensor, motion sensor, master switch, etc.) to enhance the features of the electronic lighting apparatus.

One skilled in the art will appreciate that one or more of the aforementioned components of the apparatus may be optional and/or omitted.

BRIEF DESCRIPTION OF THE DRAWINGS

The present disclosure is illustrated by way of example and not limited in the accompanying figures in which like reference numerals indicate similar elements and in which.

DETAILED DESCRIPTION

In accordance with various aspects of the disclosure, systems and apparatuses are illustrated involving solid-state light sources with enhanced designs. The enhanced design may include bending the leads of an LED about ninety degrees to point one or more LED tips along one or more horizontal planes. In one example, the enhanced design may be implemented in an electronic candle product. The electronic candle may be displayed during the holidays, such as Christmas or Hanukkah. In addition, some embodiments of the disclosed system may be useful in emergency applications, e.g., roadside assistance flares. The disclosure contemplates numerous other commercial and non-commercial applications of the disclosed systems and apparatuses, including but not limited to applications where an actual flame may pose a hazard.

Figure 1:
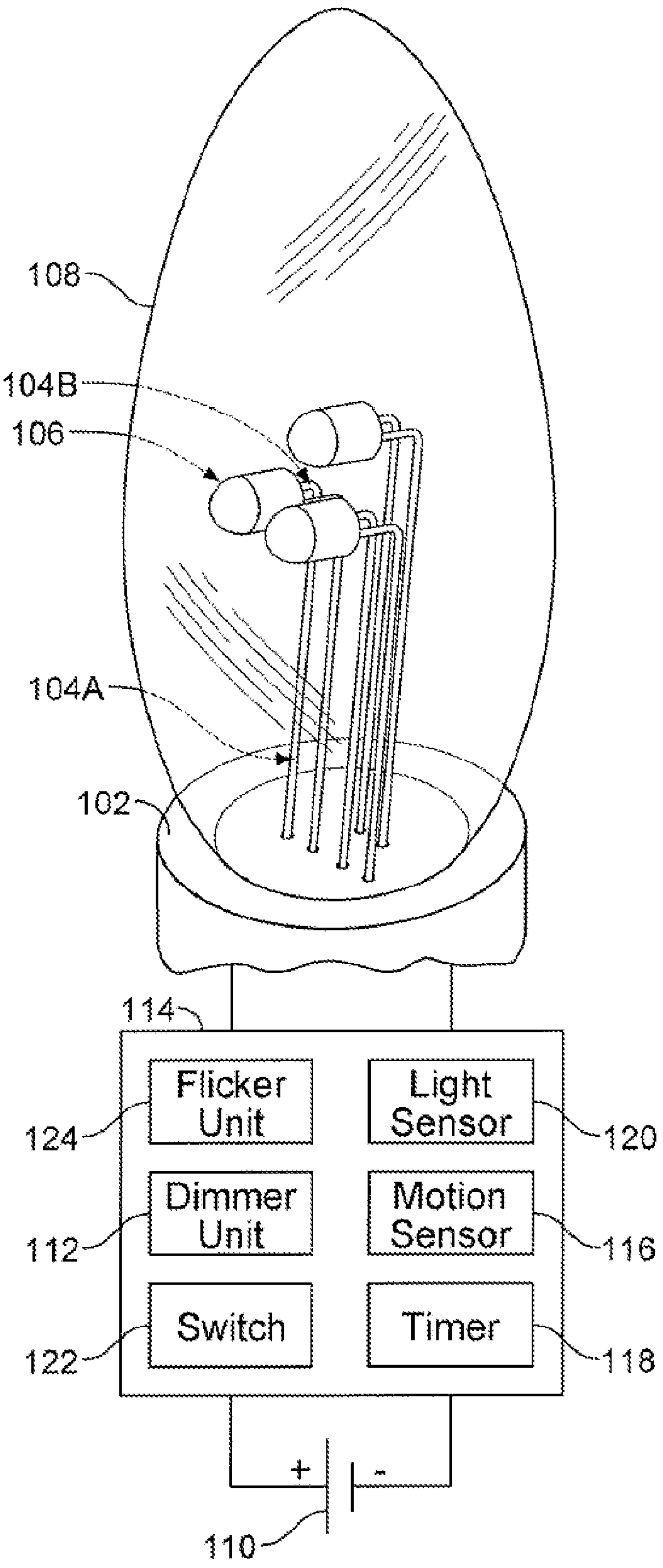
FIG. 1 illustrates a three-dimensional perspective diagram of an electronic candle showing an high-level electrical circuitry in accordance with various aspects of the disclosure.

FIG. 1 illustrates an embodiment of an apparatus in accordance with aspects of the disclosure. The apparatus of FIG. 1 includes a housing 102 affixed with one or more solid-state light sources. The solid-state light sources may, in some embodiments, be enclosed within an enclosure 108. The solid-state light sources may have one or more leads 104 extending from the light source. These leads may provide electricity from a power source 110 to the light source. The apparatus may include circuitry 114 connecting the power source 110 to the light source. The circuitry 114 may be used to connect one or more components with the light source and/or power source 110. Examples of such components include, but are not limited to a dimmer unit 112, flicker unit 124, light sensor 120, motion sensor 116, switch 122, and timer 118. One of ordinary skill in the art will appreciate that one or more components illustrated in FIG. 1 may be optional or omitted. For example, in one embodiment in accordance with various aspects of the disclosure, an apparatus may omit an enclosure 108. In another embodiment, the apparatus may include a different number of light sources and/or light source configurations.

Referring to FIG. 1, the exemplary embodiment depicts an electronic candle in accordance with various aspects of the disclosure. The housing 102 may be in the shape of a candlestick. The housing 102 may be decorated and shaped to replicate the look of a wax candle, such as the shape of a tube. For reference purposes, the axis along which the length of the tube runs may be referred to as the longitudinal axis. Moreover, the tube-shaped housing may include a top end, a bottom end, and sides. The top end of the housing may have one or more light sources affixed thereon. In various illustrative embodiments, the length of the tube along the longitudinal axis may be between one-half inch and twenty-four inches, or any other length greater or less than twenty-four inches. In addition, a cross-sectional view of the housing 102 (i.e., cut perpendicular to the longitudinal axis) may show the housing to be a circle or circle-like. In various illustrative embodiments, the diameter of the cross-sectional view of the housing 102 may be between one-quarter inch to eight inches, or any other distance greater or less than eight inches. In alternate embodiments, a cross-sectional view of the housing may reveal it to be rectangular, square, triangular, or any other shape that allows the housing to replicate a candle-like appearance. In yet other embodiments, the housing may be in the shape of a tube without necessarily looking candle-like. In another embodiment, the electronic candle may be in the form a tea light where the longitudinal axis is very short (e.g., less than a couple inches).

For example, in one embodiment the electronic candle may have a length along the longitudinal axis of twelve inches, a diameter of one-half inch, and a cross-sectional view of the housing 102 that shows the housing to be a circle. Such an electronic candle may serve as a holiday (e.g., Christmas or Hanukkah candle). In another embodiment, the electronic candle may have a length of one inch, a diameter of one inch, and a cross-sectional view of the housing 102 that shows the housing to be a circle. Such an electronic candle may serve as a tea light. In yet another embodiment, the electronic candle may have a cross-sectional view of the housing 102 that shows the housing to be a star-shape. One skilled in the art will appreciate, after review of the entirety disclosed herein, that numerous lengths, diameters, and shapes are contemplated by the disclosure, and the aforementioned embodiments are merely illustrative of the various configurations contemplated by the disclosure.

In one example in accordance with aspects of the disclosure, the electronic candle of FIG. 1 may include an enclosure 108. The enclosure 108 may be comprised of one or more materials, such as, glass, plastic, or other materials. For example, in one embodiment the enclosure 108 may be a bulb acting as a cover for one or more light sources. In addition, ornamentally, the enclosure 108 (e.g., bulb) may be flame-shaped or tulip-shaped to further simulate a candle-light flame. In yet another embodiment, the enclosure 108 may be sealed with the housing to serve as a waterproof barrier, for example, for safer outdoor use.

Further regarding the enclosure 108, in various embodiments the enclosure 108 may be completely translucent. In a different embodiment, the enclosure 108 may be at least partially opaque. A translucent enclosure may permit more light to be emitted than one that is partially or completely opaque. In yet another embodiment, the enclosure 108 may be tinted a particular color (e.g., orange) to assist in emitting colored light. For example, an electronic candle with an orange-tinted enclosure 108 and a white LED may emit orange-colored light for decoration during a holiday (e.g., Halloween). One of ordinary skill in the art, after reviewing the entirety disclosed herein, will appreciate that numerous techniques exist for causing the disclosed apparatus to emit colored light (e.g., using a colored light sources, using tinted enclosure, etc.)

The solid-state light sources depicted in FIG. 1 may, in some example, be light emitting diodes (LEDs). Numerous different types of solid-state light sources are known, including but not limited to organic light emitting diodes. In the exemplary embodiment of FIG. 1, the light sources include more than one lead (e.g., two leads) extending from the light source. In another embodiment, the light sources may include more than two leads (e.g., three leads) extending from the light source. Each of the leads may include an upper portion 104B of the lead and a lower portion 104A of the lead. In the exemplary embodiment of FIG. 1, the upper portion 104B is attached to the solid-state light source. Meanwhile, the other portion of the lead may form the lower portion 104A. In some alternate embodiments, the lead may consist of only an upper portion 104B and a lower portion 104A.

The upper portion 104B and the lower portion 104A may form a right angle (i.e., approximately 90 degrees). In other words, the apparatus may be configured such that the tip 106 of the light source may be pointing perpendicular to an axis parallel to the longitudinal axis of the housing 102. One of ordinary skill in the art, after review of the entirety disclosed herein, will appreciate that the longitudinal axis of the housing 102 itself is included in the set of parallel axis. Moreover, one of ordinary skill in the art, after review of the entirety disclosed herein, will appreciate that the use of perpendicular in this disclosure is intended to cover other angles that are nearly perpendicular (i.e., plus or minus 20 degrees). Moreover, one of ordinary skill in the art, after review of the entirety disclosed herein, will appreciate that the use of perpendicular in this disclosure is also intended to cover other angles that are substantially perpendicular (i.e., plus or minus 5 degrees). In short, the upper portion 104B and the lower portion 104A being perpendicular includes these portions being nearly or substantially perpendicular.

As will be described with respect to FIG. 2 and FIG. 3, the light source primarily emits light in the general direction of the tip 106 of the light source. The effect of such a perpendicular (or nearly/substantially perpendicular) configuration is that the light emitted from the light source is primarily in a horizontal direction (i.e., a direction perpendicular to the longitudinal axis or an axis parallel to the longitudinal axis). This output creates an enhanced illusion of candle light. For example, the light emission level of the electronic simulated candle may be increased.

Figure 2:
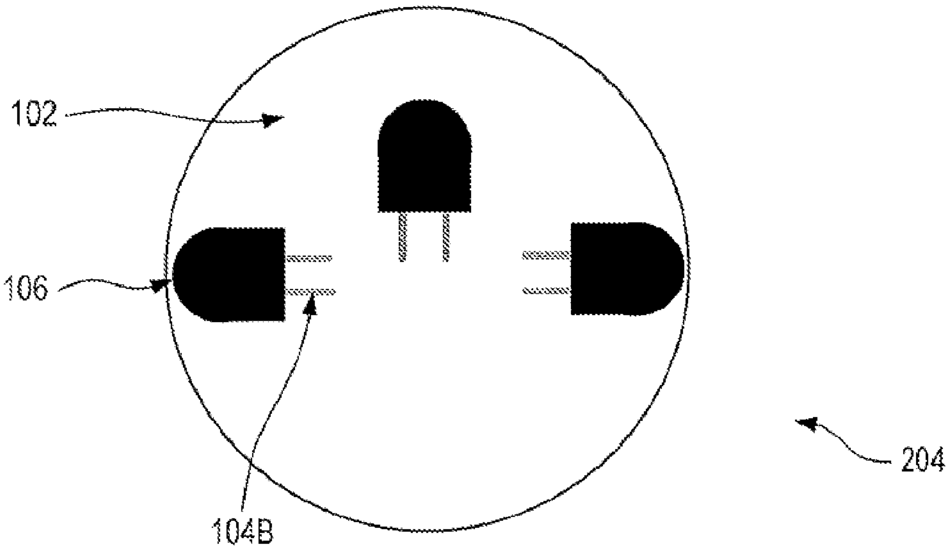
FIG. 2 shows a two-dimensional perspective showing an illustrative top view of LEDs in accordance with various aspects of the disclosure.

Referring to FIG. 2, the illustrative configuration of solid-state light sources is one example of an electronic candle configuration. In the configuration of FIG. 2, three light sources (e.g., LEDs) are affixed to a housing and shown pointing generally outwards from a central area. Diagram 204 is a top view of a similar configuration shown from a side view in diagram 202 (in FIG. 3). More or less light sources may be used in accordance with various aspects of the disclosure, and FIG. 2 is depicted as such simply for illustrative purposes. The configuration of the light sources in diagram 204 may be changed to point the tips of the light sources in a single direction, in opposite directions, in a radial (e.g., a spoked-wheel configuration where all tips face outwards from center), or any other configuration feasible for affixing onto the top end of a housing.

Figure 3:
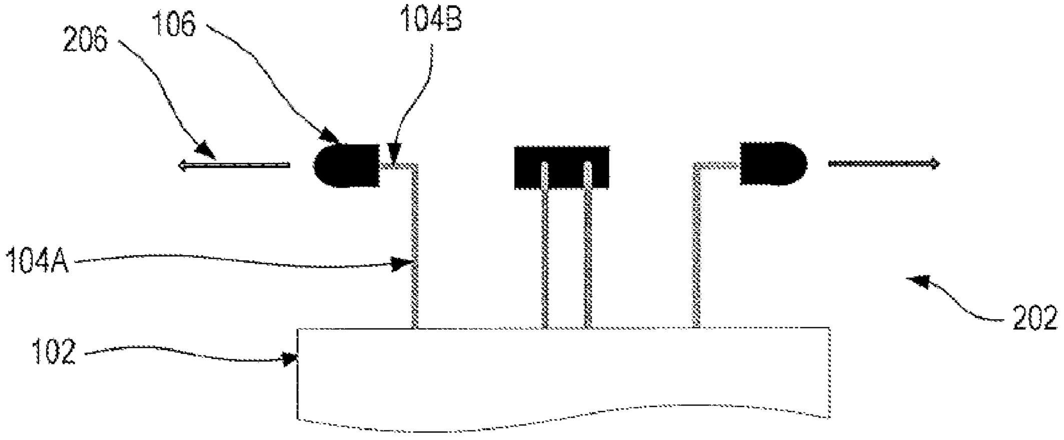
FIG. 3 shows a two-dimensional perspective showing an illustrative side view of LEDs in accordance with various aspects of the disclosure.

Referring to FIG. 3, arrow 206 shows the primary direction in which light is emitted from the light source's tip 106. In the depicted example, the particular solid-state light source was designed such that light is primarily emitted outwards from the portion of the light source furthest from the leads. Meanwhile, one of ordinary skill in the art, after review of the entirety disclosed herein, will appreciate that a light source may be designed such that the tip 106 may be a portion of the light source other than that side indicated in FIG. 3. Rather, the disclosure contemplates that tip 106 may be adjusted to be that portion of the light source that primarily emits lights in the direction of the arrow 206. In some examples in accordance with the disclosure, the tip 106 of the light sources (e.g., LEDs) affixed to the lighting apparatus may primarily emit light on different planes nearly perpendicular to the longitudinal axis of the housing. For example, the arrow 206 indicating the primary concentration of emitted light from a first LED may be about one-quarter inch above the housing 102; meanwhile, a similar arrow corresponding to a second LED may be one-half inch above the housing 102.

Referring to FIG. 1, an apparatus in accordance with the disclosure may include a power source (e.g., portable battery) 110 to provide electricity to the light source. In an alternate embodiment, the power source may be an electrical outlet that permits a circuitry 114 of the apparatus to receive electricity. The circuitry 114 may be configured to receive electricity from a power source (e.g., wall outlet) and transmit electricity to a light source through one or more leads extending from the light source. An example of such circuitry 114 may include all the wires (e.g. leads 104) and components (e.g., resistors, capacitors, etc.) of the apparatus. The circuitry 114 may be configured to interface with a power source. One skilled in the art will appreciate that numerous power sources are available. In an alternate embodiment, numerous light sources housed on different housings (e.g., in the case of a menorah) may share a single power source.

Referring to the numerous electrical components illustrated in FIG. 1, an apparatus in accordance with the disclosure may include a dimmer unit 112. The dimmer unit may connect through the circuitry 114 to at least one of a plurality of leads extending from the light sources and a power source. One skilled in the art will appreciate, after review of the entirety disclosed herein, that dimming may be accomplished through analog controls of the current levels, by PWM (pulse-width modulation) with a variable duty cycle, or any other known technique. A dimmer unit may include one or more electrical circuitry and/or software/firmware to regulate/adjust the electrical current to the light source (thus the light intensity outputted by the light source). In one embodiment, the dimmer unit may be configured to adjust the maximum intensity of light emitted from the light source. In such an embodiment, other electrical components (e.g., flicker unit 124) may also change the intensity of the emitted light, but the dimmer unit 112 may regulate the maximum allowed brightness of the simulated flickering light.

In addition, referring to yet another electrical component illustrated in FIG. 1, an apparatus in accordance with the disclosure may include a flicker unit 124. The flicker unit 124 may connect through the circuitry 114 to at least one of a plurality of leads extending from the light sources and a power source 110. The flicker unit 124 is configured to repeatedly adjust intensity of light emitted from the light source to simulate a flickering candle. One skilled in the art will appreciate, after review of the entirety disclosed herein, that flickering may be accomplished using any one of numerous units known in the prior art. In one embodiment, the apparatus may include a control to fine tune the interval at which the emitted light is simulated to flicker. For example, the flicker unit 124 may change the intensity of the light emitted every 0.5 seconds to simulate a flickering candle. In another example, the flicker unit 124 may flicker the emitted light at varying intervals of time and at varying intensities.

Furthermore, referring to another electrical component illustrated in FIG. 1, an apparatus in accordance with the disclosure may include a light sensor 120. The light sensor 120 may connect through the circuitry 114 to at least one of a plurality of leads extending from the light sources and a power source 110. The light sensor 120 is configured to allow electricity to transmit through the circuitry 114 when the light sensor fails to detect light (or conversely, to block electricity when the light sensor detects light). In other words, at dusk the light sensor 120 activates the light source and then deactivates the light source at dawn. Numerous light sensors are known in the art, including photosensors and other sensors that detect the presence or absence of light. In some embodiments, a master switch 122 may overrule the light sensor 120, and the master switch 122 may cause the lighting apparatus to remain OFF even if the light sensor 120 detects a lack of light. In another example, the lighting apparatus activated by the light sensor 120 may include a flicker unit 124 that causes the emitted light to simulate a flickering candle.

In addition, referring to another electrical component illustrated in FIG. 1, an apparatus in accordance with the disclosure may include a motion sensor 116. The motion sensor 116 may connect through the circuitry 114 to at least one of a plurality of leads extending from the light sources and a power source 110. The motion sensor 116 is configured to allow electricity to transmit through the circuitry 114 when the motion sensor detects movement. The lighting apparatus may include circuitry to restore the state of the light source (e.g., whether it was previously ON or OFF) after a predetermined amount of time after the motion sensor 116 detects motion. For example, the motion sensor 116 detects movement and turns ON the light source (i.e., does not block the flow of electricity from the power source 110 to the leads 104 into the light source) for a minimum of ten minutes. If movement continues during the ten minute time period, the countdown timer may be reset to a full ten minutes. A timer 118 may be used in coordination with the motion sensor 116.

Also, referring to yet another electrical component illustrated in FIG. 1, an apparatus in accordance with the disclosure may include a timer unit 118. The timer unit 118 may connect through the circuitry 114 to at least one of a plurality of leads extending from the light sources and a power source 110. The timer unit 118 may be configured to allow electricity to transmit through the circuitry 114 from the power source 110 to the solid-state light source during predetermined intervals of time. In one example, the timer unit 118 may be programmed to turn ON the light source at 9:00 pm every night and turn OFF the light source at 3:00 am every day. In another example, the timer unit 118 may include countdown timer functionality for use in connection with one or more other electrical components of FIG. 1.

Finally, referring to another electrical component illustrated in FIG. 1, an apparatus in accordance with the disclosure may include a master switch 122. The switch 122 may connect through the circuitry 114 to at least one of a plurality of leads extending from the light sources and a power source 110. The switch 122 may be configured to allow or block the flow of electricity through the circuitry 114 from the power source 110 to the solid-state light source. In the ON position/state, the switch 122 may permit the electricity to proceed to the solid-state light source. The switch 122 may override the electric flow allowed (or blocked) by one or more other electrical components connected with the circuitry 114. For example, if the switch 122 is on the OFF position, the arrival of nightfall or detection of motion will fail to activate the light sensor because the outcome of the master switch 122 overrides the other components.

FIG. 1 depicts various electrical circuitry and components (e.g., battery 110) as externally visible for illustrative purposes. Some or all of this circuitry and components may be hidden inside the housing 102 and/or may be located within a separate protective housing. For example, in one embodiment, all of circuitry 114, including timer 118, may be located in the base of the bulb and/or bulb housing. For example, a user may screw the bulb illustrated in FIG. 1 into a socket and the timer 118 may be automatically set. The timer 114 and other circuitry components may all be physically located within the base of the bulb. In another example, at least one benefit of locating all of circuitry 114 in the base of the bulb is the ease with which the bulb may be operated, integrated into other systems, and distributed. Moreover, in some instances it may be beneficial to hide electrical circuitry and components to better simulate an imitation wax candle. One of skill in the art, after review of the entirety herein, will appreciate that one or more electrical components illustrated in FIG. 1 may be optional and/or omitted.

Referring to FIG. 2 and FIG. 3, the disclosure does not require a specific configuration (e.g., diagrams 202 and 204) of solid-state light sources. In one example, the leads extending from an LED may be perpendicular to the longitudinal axis of the housing of the apparatus. The tip 106 of the LEDs may require adjustment if the LED is not the same type of solid-state light source depicted in FIG. 2 and FIG. 3. Finally, one of ordinary skill in the art will appreciate after review of the entirety disclosed herein that various aspects of the disclosure have been described in terms of illustrative embodiments thereof. Numerous other embodiments, modifications and variations within the scope and spirit of the appended claims will occur to persons of ordinary skill in the art from a review of this disclosure. In another example, one of ordinary skill in the art will appreciate that the components depicted in the illustrative figures may be positioned in other than the recited arrangement, and that one or more components illustrated may be optional in accordance with aspects of the disclosure.

The invention claimed is:

1. An electronic candle configured for streetside brightness facing outside a window with a softer glow facing inside the window, the electronic candle comprising:

a bulb encompassing a plurality of solid-state light sources;

a candle-shaped housing configured to be affixed with the plurality of solid-state light sources, wherein a first solid-state light source of the plurality of solid-state light sources comprises at least two leads, and wherein the first solid-state light source is positioned to primarily emit light towards a first streetside direction, which is at an angle to a perpendicular axis to a longitudinal axis of the candle-shaped housing, while emitting, in a direction opposite the first streetside direction, a less bright light than the first streetside direction; and a circuitry configured to transmit electricity to at least the first solid-state light source using the at least two leads.

2. The electronic candle of claim 1, wherein the plurality of solid-state light sources consists of three light-emitting diodes affixed to the candle-shaped housing, and wherein the at least two leads extending from the first solid-state light source is bent to be positioned at a nearly perpendicular angle to the longitudinal axis of the candle-shaped housing.

3. The electronic candle of claim 2, wherein each of the three light-emitting diodes primarily emits light on a different plane nearly perpendicular to the longitudinal axis of the candle-shaped housing, and wherein the first streetside direction is nearly perpendicular to the longitudinal axis of the candle-shaped housing.

4. The electronic candle of claim 1, further comprising:

a dimmer unit connected to the circuitry, wherein the dimmer unit is configured to adjust maximum intensity of light emitted from the light source;

a flicker unit connected to the circuitry, wherein the flicker unit is configured to repeatedly adjust intensity of light emitted from the light source to simulate a flickering candle;

a light sensor connected to the circuitry, wherein the light sensor is configured to allow electricity to transmit through the circuitry from the power source to the solid-state light source when the light sensor fails to detect light;

a motion sensor connected to the circuitry, where the motion sensor is configured to allow electricity to transmit through the circuitry from the power source to the solid-state light source for a predetermined amount of time after the motion sensor detects motion;

a timer unit connected to the circuitry, wherein the timer unit is configured to allow electricity to transmit through the circuitry from the power source to the solid-state light source during predetermined intervals of time; and a master switch to control whether electricity is allowed to flow through the circuitry from the power source to the solid-state light source.

5. The electronic candle of claim 1, wherein the angle is ninety degrees, and wherein the bulb is flame-shaped.

6. The electronic candle of claim 1, wherein the angle furthers a simulation of an illusion of flickering candle light.

7. An electronic lighting apparatus configured for streetside brightness facing outside a window with a softer glow facing inside the window, the apparatus comprising:

an enclosure encompassing at least one solid-state light source;

a housing configured to be affixed with the at least one solid-state light source;

a means for emitting bright light in a first direction while emitting less bright light in a direction opposite the first direction, wherein the at least one solid-state light source comprises a plurality of leads extending from each of the at least one solid-state light source, and wherein each of the plurality of leads comprises an upper portion and a lower portion, and wherein the at least one solid-state light source is configured to primarily emit light towards the first direction, which is facing streetside, while emitting, in the direction opposite the first direction, less bright light than the first direction, by positioning the lower portion parallel to a longitudinal axis of the housing and positioning the upper portion at an angle with respect to a perpendicular axis to the lower portion, and wherein the upper portion is positioned with respect to the lower portion so that the angle is not a straight line; and a circuitry configured to receive electricity from a power source and provide the electricity to the at least one solid-state light source through the plurality of leads.

8. The apparatus of claim 7, wherein the means for emitting bright light in a first direction while emitting less bright light in a direction opposite the first direction comprises at least one solid-state light source comprises three light emitting diodes with two leads extending from each of the three light emitting diodes, and wherein at least two of the three light-emitting diodes primarily emit light on a different plane nearly perpendicular to the longitudinal axis of the housing, and the positioning is configured to simulate an illusion of flickering candle light.

9. The apparatus of claim 8, wherein the housing is in a shape of a candle, and wherein the enclosure is flame-shaped, and wherein the at least one solid-state light source is affixed to a top end of the tube.

10. The apparatus of claim 7, wherein the enclosure is translucent, and the first direction is nearly perpendicular to the longitudinal axis of the housing.

11. The apparatus of claim 7, wherein the power source is a portable battery, and wherein the angle is twenty degrees, and the positioning is configured to simulate an illusion of flickering candle light.

12. The apparatus of claim 7, comprising:

a dimmer unit connected to the circuitry, wherein the dimmer unit is configured to adjust intensity of light emitted from the light source;

a flicker unit connected to the circuitry, wherein the flicker unit is configured to repeatedly adjust intensity of light emitted from the light source to simulate a flickering candle;

a master switch to control whether electricity is allowed to flow through the circuitry from the power source to the solid-state light source.

13. The apparatus of claim 7, comprising:

a light sensor connected to the circuitry, wherein the light sensor is configured to allow electricity to transmit through the circuitry from the power source to the solid-state light source when the light sensor fails to detect light.

14. The apparatus of claim 7, comprising:

a motion sensor connected to the circuitry, wherein the motion sensor is configured to allow electricity to transmit through the circuitry from the power source to the solid-state light source for a predetermined amount of time after the motion sensor detects motion; and a timer unit connected to the circuitry, wherein the timer unit is configured to allow electricity to transmit through the circuitry from the power source to the solid-state light source during predetermined intervals of time.

15. An electronic lighting apparatus configured for street-side brightness facing outside a window with a softer glow facing inside the window, the apparatus comprising:

at least two solid-state light sources comprising at least two leads extending from each of at least two solid-state light sources, wherein each of the at least two leads comprises an upper portion and a lower portion;

a candle-shaped housing configured to be affixed with the at least two solid-state light sources;

wherein the at least two solid-state light sources are configured to primarily emit light towards a first direction, which is facing streetside, while emitting, in a direction opposite the first direction, a softer light than the first direction, and wherein the upper portion of the at least two solid-state light sources is positioned at an angle with respect to a perpendicular axis to the lower portion of the at least two solid-state light sources, and wherein the upper portion is positioned with respect to the lower portion so that the angle is not a straight line; and a circuitry configured to provide electricity to the at least two solid-state light sources through their respective at least two leads.

16. The apparatus of claim 15, comprising:

a tulip-shaped enclosure enclosing the at least two solid-state light sources.

17. The apparatus of claim 16, wherein the enclosure is a tinted color configured to cause the electronic lighting apparatus to emit colored light.

18. The apparatus of claim 15, comprising:

a dimmer unit connected to the circuitry between the at least two leads extending from the light source and a power source, wherein the dimmer unit is configured to adjust maximum intensity of light emitted from the light source;

a light sensor connected to the circuitry, wherein the light sensor is configured to allow electricity to transmit through the circuitry from the power source to the solid-state light source when the light sensor fails to detect light; and a master switch to control whether electricity is allowed to flow through the circuitry from the power source to the solid-state light source.

19. The apparatus of claim 15, comprising:

a flicker unit connected to the circuitry between the at least two leads extending from the light source and a power source, wherein the flicker unit is configured to adjust, at an interval, an intensity of light emitted from the light source to simulate a flickering candle;

a motion sensor connected to the circuitry, wherein the motion sensor is configured to allow electricity to transmit through the circuitry from the power source to the solid-state light source for an amount of time after the motion sensor detects motion; and a timer unit connected to the circuitry, wherein the timer unit is configured to allow electricity to transmit through the circuitry from the power source to the solid-state light source during predetermined intervals of time.

20. The apparatus of claim 15, wherein the first direction is nearly perpendicular to an axis of the candle-shaped housing.

* * * * *